United States Patent [19]

Magee

[11] Patent Number: 4,747,437
[45] Date of Patent: May 31, 1988

[54] RESILIENT TRACTION DEVICE FOR PNEUMATIC TIRES

[76] Inventor: James T. Magee, 17701 West Winnebago, Grayslake, Ill. 60073

[21] Appl. No.: 900,284

[22] Filed: Aug. 25, 1986

[51] Int. Cl.⁴ ............................................. B60C 27/02
[52] U.S. Cl. ................................. 152/225 C; 152/228
[58] Field of Search ................... 152/213 R, 208, 217, 152/218, 221, 222, 225 R, 225 C, 226–228

[56] References Cited

U.S. PATENT DOCUMENTS

| | | | |
|---|---|---|---|
| 2,330,839 | 10/1943 | O'Brien | 152/233 |
| 2,518,170 | 8/1950 | Otis | 152/225 R |
| 2,625,193 | 1/1953 | LaRocca | 152/225 R |
| 2,722,260 | 11/1955 | Renwick, Sr. | 152/225 R |
| 3,323,572 | 6/1967 | Farah | 152/208 |
| 3,473,592 | 10/1969 | Marks | 152/213 R |
| 4,098,313 | 7/1978 | Ingerson | 152/213 R |
| 4,244,412 | 1/1981 | Seggio | 152/218 |

Primary Examiner—Donald E. Czaja
Assistant Examiner—Thomas Bokan
Attorney, Agent, or Firm—Marshall, O'Toole, Gerstein, Murray & Bicknell

[57] ABSTRACT

A traction device for mounting on pneumatic tire to assist in extricating a motor vehicle from snow, ice or mud is disclosed. The traction device, generally U-shaped in cross section, is provided with a wide base having an upwardly-curving segment which results in greater gripping action when the device is mounted on a tire.

9 Claims, 2 Drawing Sheets

RESILIENT TRACTION DEVICE FOR PNEUMATIC TIRES

BACKGROUND OF THE INVENTION

The present invention is directed to apparatus adapted to be mounted on one or more driven wheels of a motor vehicle in order to increase traction. More particularly, the present invention comprises a removable traction device which can be used to assist in extricating an automobile, truck or other vehicle from mud, ice or snow. The traction device is adapted to fit a variety of tire sizes, can be conveniently stored in a motor vehicle until needed, and can be mounted and dismounted on a wheel without the use of tools.

The prior art is replete with apparatus intended to overcome the loss of traction due to the effects of ice and snow. Many such devices are prophylactic in nature, e.g., special tires or equipment designed to prevent the vehicle from becoming stuck. A common example of such apparatus are automotive, anti-skid tire chains, which are designed to be mounted on the drive wheels of a motor vehicle at the onset of winter and to remain upon the vehicle for an extended period of time. Not only are tire chains difficult to install and remove, but they are also generally necessary for only a few winter days in many locales.

Other examples of traction devices designed to be mounted on a vehicle wheel prior to venturing into ice and snow are found in the following prior art patents, viz., U.S. Pat. No. 2,722,260, and U.S. Pat. No. 4,244,412. A common deficiency with such devices is that they are typically quite difficult to attach to a vehicle wheel after the car has become stuck or mired.

The prior art contains several devices which, like the apparatus of the present invention, are designed to be mounted on a pneumatic tire of a mired auto or other vehicle to extricate the vehicle from ice, snow or mud. A feature common to all of these prior art devices is that they must be fairly precisely engineered to fit the size and contour of the tire with which they are utilized. In view of the variety of tire sizes in use today, manufacture and inventory of a number of sizes required to fit all vehicles is a difficult proposition. Moreover, the cross-section (profile) of a tire is highly dependent on the degree of inflation, which in turn is temperature related. As a result, a device designed to fit snuggly around a tire which is properly inflated might very well be inappropriate to the same tire in an under-inflated condition.

U.S. Pat. No. 2,518,170 discloses a traction device for a pneumatic tire comprising a pair of clamp members pivotally joined at the road-bearing surface. The device illustrated in this patent must be carefully fitted to the tire since the device is adapted to be mounted on the vehicle's tire rim. In addition, the patent teaches that a tool is required to mount or dismount the device from the tire.

U.S. Pat. No. 4,244,412 shows an anti-skid device formed of a plurality of inter-connected U-shaped elements. Like the apparatus of the present invention, the apparatus illustrated in this patent employs an upwardly curving segment on the base of the U-shaped device to transmit locking forces to the vertical sections of the traction device in order to more closely grip the sidewall of the tire on which it is mounted. This patent teaches the necessity of a supplemental apparatus to secure the device to the tire rim. Moreover, the device illustrated in the patent closely follows the contour of the tire sidewall.

U.S. Pat. No. 2,625,193 depicts a multi-element wire loop device adapted to be mounted on a pneumatic tire. Like the U.S. Pat. No. 4,244,412 patent, this patent teaches the desirability of utilizing an upwardly curving surface of the traction device to provide better gripping action. Additionally, the patent teaches the use of protuberances along portions of the contacting surface of the traction device to retain the device on the tire. The device illustrated in this patent is designed to closely mirror the geometry of the tire on which it is mounted.

U.S. Pat. No. 3,323,572 shows an anti-skid device which utilizes an adhesive backing for mounting the device to a tire. Although this apparatus can be employed with a variety of tire sizes, the apparatus is suitable for one-time use only, unlike the device of the present invention which can be easily dismounted and stored for re-use.

SUMMARY OF THE INVENTION

The traction device of the present invention is a unitary flexible apparatus having a base portion and two up-standing side arms extending generally vertically from the base portion, thereby defining an opening for fitting the device to a wheel of a motor vehicle. The traction device base portion is adapted to be substantially wider than the thread portion of the pneumatic tire to which it is fitted in transverse relationship, thus providing a larger surface area for frictional contact with a slippery surface such as mud, snow or ice. The base portion also has a bendable, upwardly curving segment for contacting the tread portion of the pneumatic tire.

Each of the traction device side arms has a convex bottom section and an inwardly converging top section for engaging the sidewalls of the pneumatic tire on which the device is mounted. As the vehicle wheel is rotated, the traction device comes into contact with the ground and pressure is brought to bear on the upwardly curving segment of the base portion. The resultant force on the curved segment is transmitted through the side arms to the pneumatic tire sidewalls. The effect of the wider base portion and convex bottom section is to intensify the gripping effects of the side arms. As a result, the traction device will remain firmly anchored to the vehicle wheel.

The traction device can be manufactured from a resilient material such as thin metal, or a thermoplastic or thermosetting polymer or resin. If a polymer or resin is employed, the material can be reinforced with metal, ceramics or glass if desired. When an injection molding process is utilized, preferred materials for manufacturing the device include the thermo-plastic acetal copolymers manufactured under the tradename Celcon ® by the Celanese Corporation and Delron ® by E. I. DuPont de Nemours & Co. and a glass-reinforced polyamide-imide containing resin marketed by Amoco Chemicals Corporation under the trademark Torlon ®. Other materials and processes will be apparent to those skilled in the art.

In order to achieve better frictional contact with the sidewalls and tread portion of the tire, it may be desirable to provide supplemental grip means along the inside surface of the traction device such as serrations or a flange or ridge.

Various other features and advantages of the invention will become apparent from the following detailed

DETAILED DESCRIPTION OF THE PREFERRED EMBODIMENTS

Figure 1:
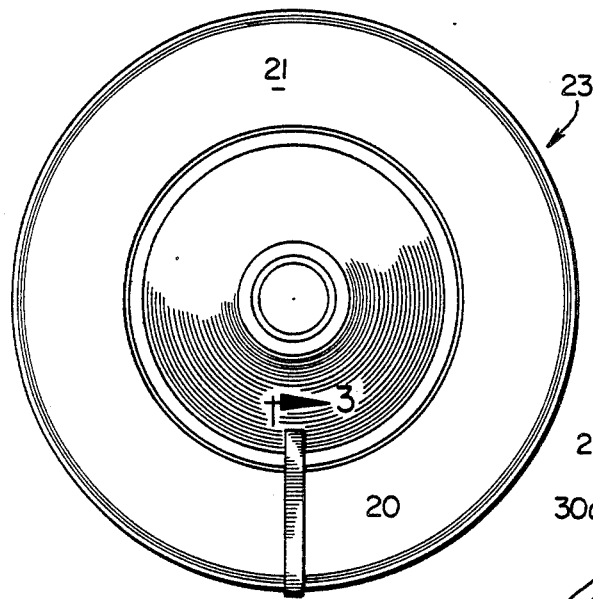
FIG. 1 is a side elevational view showing a traction device according to the present invention mounted transversely on a pneumatic tire.
Figure 2:
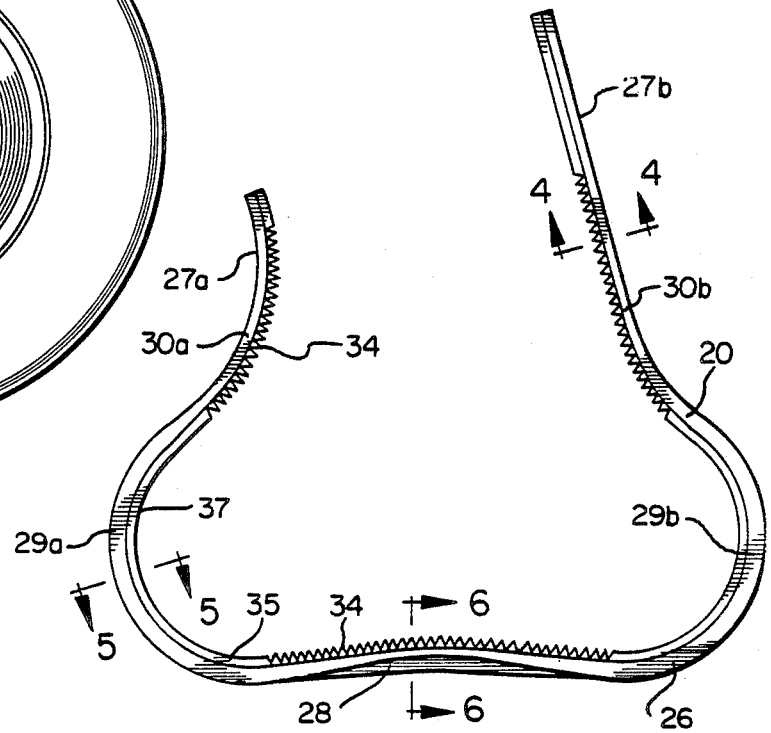
FIG. 2 is a side elevational view of the traction device of FIG. 1.
Figure 3:
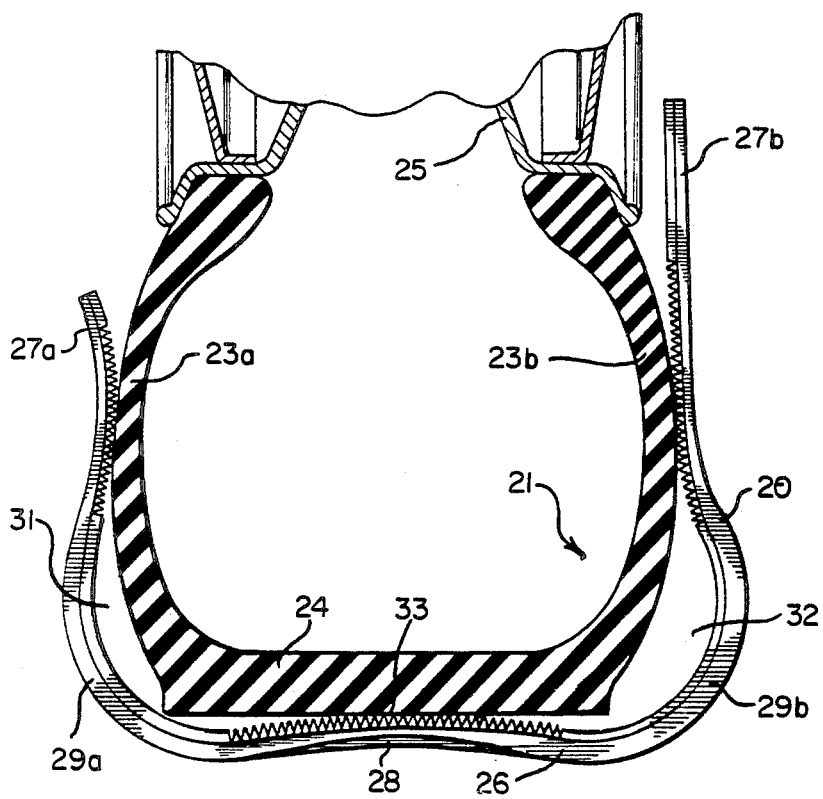
FIG. 3 is a cross-sectional view taken along line 3—3 of FIG. 1.
Figure 4:
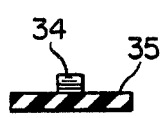
FIG. 4 is a sectional view taken along line 4—4 of FIG. 2.
Figure 5:
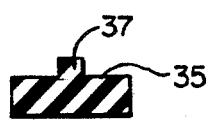
FIG. 5 is a sectional view taken along line 5—5 of FIG. 2.
Figure 6:
FIG. 6 is a sectional view taken along line 6—6 of FIG. 2.
Figure 7:
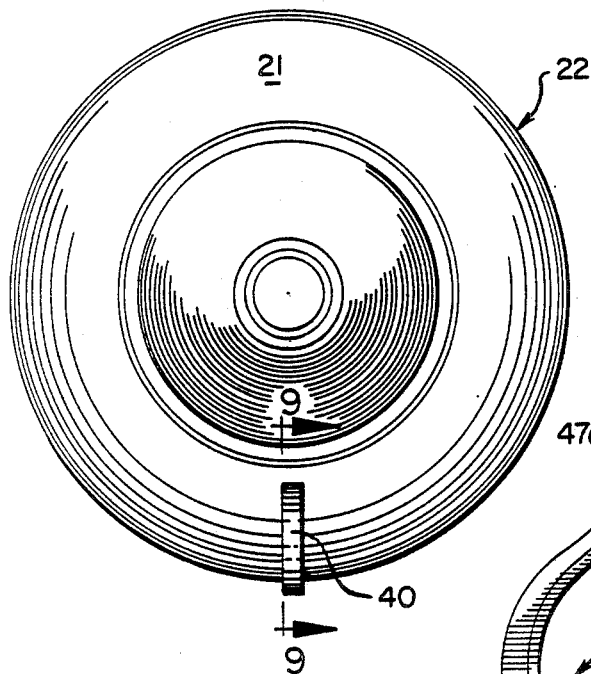
FIG. 7 is a side elevational view showing a second embodiment of a traction device according to the present invention mounted on a vehicle wheel.
Figure 8:
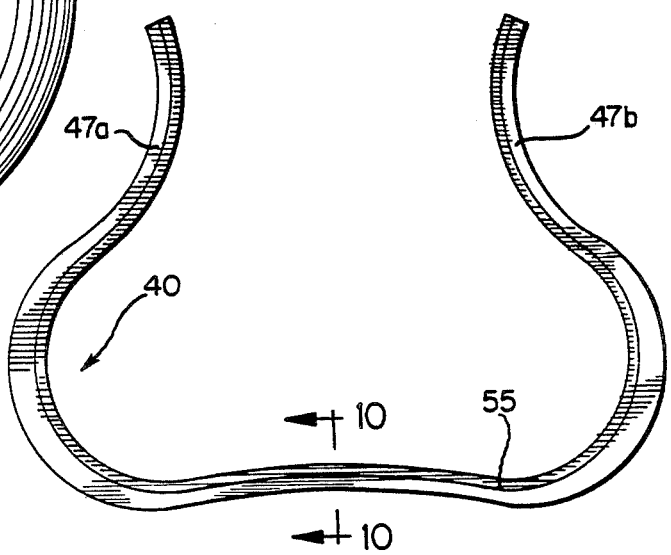
FIG. 8 is a side elevation view of the traction device shown in FIG. 7.
Figure 9:
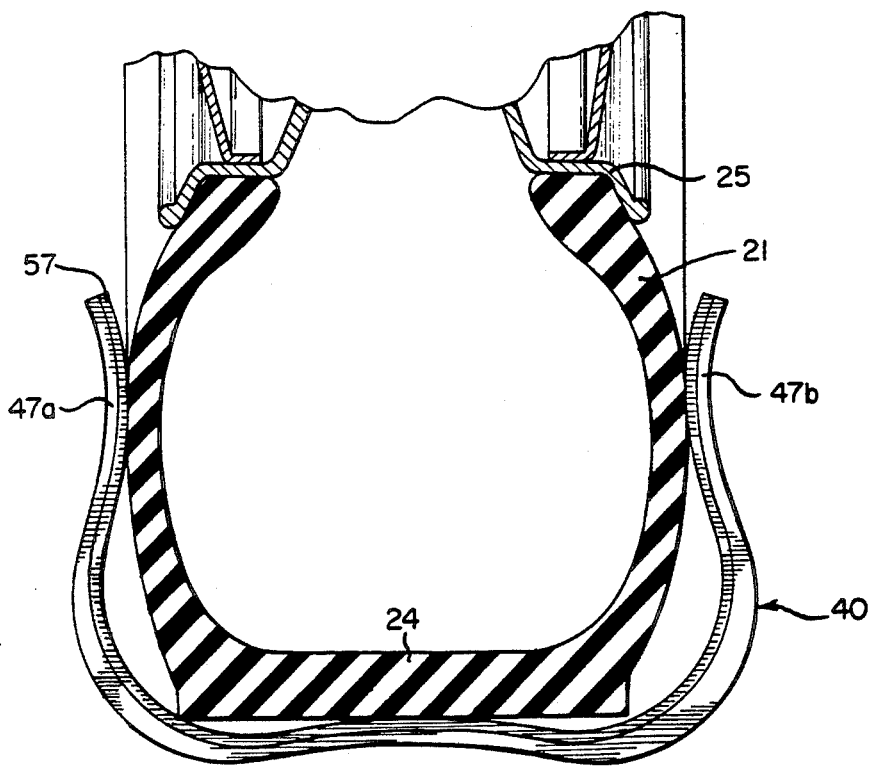
FIG. 9 is a cross-sectional view taken along line 9—9 of FIG. 7.
Figure 10:
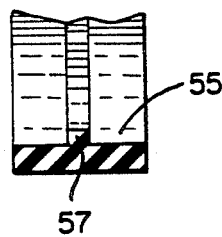
FIG. 10 is a fragmentary sectional view taken along line 10—10 of FIG. 8.

One embodiment of a unitary traction device 20 in accordance with the present invention is shown in FIGS. 1–6. Traction device 20 is adapted to be transversely mounted on a pneumatic tire 21 which is attached to a vehicle drive wheel 23 at rim 25 (FIG. 3). Pneumatic tire 21 has a pair of sidewalls 23a,23b and a tire tread portion 24.

Traction device 20 is fashioned from a resilient material to form a substantially U-shaped structure having a base portion 26, and a pair of side arms 27a,27b extending generally vertically from base portion 26. Base portion 26 is substantially axially wider than the tread portion 24 of tire 21 and has an upwardly curving segment 28 which, when mounted on tire 21, bears against a road-engaging surface 33 of tire tread 24.

Traction devide side arms 27a,27b have respective convex bottom portions 29a,29b and inwardly curving top sections 30a,30b. Traction device side arm 27b is longer than arm 27a and can be easily grasped to mount and dismount device 20. The longer side arm also provides additional surface contact to minimize rotation and prevent dislodging. When traction device 20 is mounted on tire 21 (FIG. 3), the convex bottom portions 29a,29b cooperate with base portion 26 and pneumatic tire 21 to define a pair of pockets 31,32.

In FIG. 2, resilient traction device 20 is shown in a normal, relaxed position and the distance between side arms 27a,27b is minimal. In order to be mounted on tire 21, side arms 27a,27b are pulled apart to a wider position. As a result, when placed on tire 21 in the position shown in FIG. 3, side arms 27a and 27b exert inward pressure against pneumatic tire sidewalls 23a and 23b. This pressure or tension serves to hold device 20 in place on tire 21.

As the full weight of the vehicle is brought to bear on drive wheel 22 and traction device 20, it is generally desirable to provide additional gripping action between sidewalls 23a,23b and side arms 27a,27b. This gripping action is provided by the interaction of bottom portion upwardly curving segment 28 and side arm convex bottom portions 29a,29b. The weight of the vehicle (not shown) exerts a flattening effect on curving segment 28 which is translated through and causes movement of bottom portions 29a,29b which causes further movement of side arm top portions 30a, 30b. The fact that traction device base portion 26 is wider than tire tread portion 24 results in the fulcrums for these forces being spaced apart from road-engaging surface 33 of tire 21. As a result, greater gripping forces are transmited by the downward action of tire 21 on curving segment 28, through the area of convex bottom portions 29a, 29b to sidewall gripping side arms 27a,27b. Thus, device 20 is particularly adapted to respond to increased pressure by providing greater gripping action.

Referring now to FIGS. 2 and 4–6, device 20 has a strengthening rib 37 extending around an inner surface 35 thereof. Additional frictional engagement between device 20 and tire sidewalls 23a,23b and tread 24 can be obtained by the use of supplemental gripping means such as serrations 34 along inner surface 35.

FIGS. 7–10 illustrate a second embodiment of a resilient traction device 40 according to the present invention, having a pair of sidearms 47a,47b which are substantially equal in size and do not extend beyond wheel rim 25. Traction device 40 has a rib or vertical flange 57 extending continuously along the inner surface 55 thereof. Vertical flange 57 exerts a biting action on tire tread 24 when downward pressure is brought to bear on wheel 22. The operation of device 40 (FIG. 8) when mounted on tire 21 (FIG. 9) is similar to that of device 20 (FIGS. 2 and 3), as described above.

What is claimed is:

1. A resilient, unitary traction device for transverse mounting on a pneumatic tire connected to a tire rim and having a tire tread portion and a pair of sidewalls, said traction device comprising
    a base portion for placement adjacent to the tread section said base portion extends axially outwardly beyond said tread section for providing a larger surface area for traction on the ground and to act as a lever arm, said base portion having an upwardly curving segment which is bendable and is adapted to bear against the surface of said tire tread; and
    a pair of side arms extending generally vertically from said base portion, said side arms not conforming to the identical shape of the sidewalls, and each of said side arms having a convex bottom section, said convex bottom section not being in contact with either sidewall, and each of said side arms having an inwardly converging top section for engaging a sidewall of said pneumatic tire, said base portion, said upwardly curving segment, said convex bottom sections and the inwardly converging top sections interact when the traction device is interposed between the pneumatic tire and the ground so that said upwardly curving segment is pressed downwardly towards the ground causing said convex bottom sections connected to said base portion to rotate connected said inwardly converging top sections further towards the sidewalls of the tire for better and additional gripping action while maintaining the device free of any interaction with the tire rim.

2. The traction device of claim 1 further including tire gripping means mounted longitudinally along the inner surface of said traction device.

3. Apparatus according to claim 2 wherein said tire gripping means comprises serrations in the curving segment of said base portion and in the top sections of said side arms.

4. Apparatus according to claim 2 wherein said tire gripping means comprises a vertical flange extending upwardly from said inner surface of said traction device.

5. The traction device of claim 1 wherein said device is manufactured from an acetal copolymer.

6. The traction device of claim 5 wherein said acetal copolymer includes a reinforcing material.

7. The traction device of claim 1 wherein said device is manufactured from a glass-reinforced polyamide-imide resin.

8. The traction device of claim 6 wherein said reinforcing material is thin metal.

9. The traction device of claim 1 wherein said device is manufactured from thin metal.

* * * * *